United States Patent
Xu et al.

(10) Patent No.: US 11,531,706 B2
(45) Date of Patent: Dec. 20, 2022

(54) GRAPH SEARCH USING INDEX VERTICES

(71) Applicant: GraphSQL, Inc., Redwood City, CA (US)

(72) Inventors: Yu Xu, Millbrae, CA (US); Zixuan Zhuang, San Jose, CA (US); Dan Hu, Sunnyvale, CA (US); Xinyu Chang, Menlo Park, CA (US)

(73) Assignee: GraphSQL, Inc., Redwood City, CA (US)

( * ) Notice: Subject to any disclaimer, the term of this patent is extended or adjusted under 35 U.S.C. 154(b) by 88 days.

(21) Appl. No.: 16/585,621

(22) Filed: Sep. 27, 2019

(65) Prior Publication Data

US 2021/0064660 A1    Mar. 4, 2021

Related U.S. Application Data (60) Provisional application No. 62/892,137, filed on Aug. 27, 2019.

(51) Int. Cl.
  *G06F 16/901* (2019.01)
  *G06F 16/903* (2019.01)
(52) U.S. Cl.
  CPC ........ *G06F 16/9024* (2019.01); *G06F 16/903* (2019.01)
(58) Field of Classification Search
  CPC . G06F 16/9024; G06F 16/9027; G06F 16/903
  See application file for complete search history.

(56) References Cited

U.S. PATENT DOCUMENTS

| | | | |
|---|---|---|---|
| 2011/0099205 A1* | 4/2011 | Shmueli ................ | G06F 16/81 707/797 |
| 2013/0232153 A1* | 9/2013 | Dhuse .................... | G06F 11/10 707/741 |
| 2016/0267166 A1* | 9/2016 | Kohlmeier ............ | G06F 16/285 |
| 2019/0182119 A1* | 6/2019 | Ratkovic ............... | H04L 43/045 |
| 2020/0050889 A1* | 2/2020 | Mahalanobish ...... | G06F 16/322 |
| 2020/0184026 A1* | 6/2020 | Espino ................ | G06F 11/3457 |
| 2020/0242164 A1* | 7/2020 | Gowda ............... | G06F 16/9024 |
| 2020/0320130 A1* | 10/2020 | Korpman .............. | G06F 16/244 |
| 2020/0401583 A1* | 12/2020 | Church ................ | G06F 16/248 |
| 2020/0409931 A1* | 12/2020 | Zang .................. | G06F 11/1471 |
| 2020/0410002 A1* | 12/2020 | Rossi ................. | G06F 16/9024 |
| 2021/0019325 A1* | 1/2021 | Edge ........................ | H04L 51/22 |
| 2021/0056104 A1* | 2/2021 | Tong ................ | G06F 16/24534 |

* cited by examiner

*Primary Examiner* — Robert W Beausoliel, Jr.
*Assistant Examiner* — Nirav K Khakhar (57) ABSTRACT

Systems, methods, and software described herein provide graph searching via index vertices. In one implementation, a graph management system may receive a request to identify vertices of a first vertex type in a graph, wherein the request defines one or more attributes associated with the vertices. In response to the request, the graph management system may identify one or more index vertices associated with the one or more attributes, wherein the one or more index vertices is associated with one or more second vertex types. The graph management system may further identify the vertices in the graph with edges that couple to the one or more index vertices.

17 Claims, 7 Drawing Sheets

GRAPH SEARCH USING INDEX VERTICES

RELATED APPLICATIONS

This application hereby claims the benefit and priority to U.S. Provisional Patent Application 62/892,137, titled "GRAPH SEARCH USING INDEX VERTICES" filed Aug. 27, 2019, and which is hereby incorporated by reference in its entirety.

BACKGROUND

Relational databases generally store data in one or more tables with rows and columns for the various data items. In contrast, graph databases represent data in the form of vertices and edges, where a vertex represents an entity or data instance, and an edge represents a relationship of some type between any two vertices. Graph database representations allow data modeling that more closely parallels the real world and provides a visual representation of connected data. In general, a graph is a set of objects, called vertices, nodes, or points, which are connected by links, called lines or edges. The edges establish relationships (connections) between the vertices. Graphs can be directed or undirected. In an undirected graph, an edge from point A to point B is considered to be the same as a line from point B to point A. In a directed graph, the two directions are treated as distinct directed edges.

Although graph databases provide an efficient manner for storing data, difficulties can arise in efficiently responding to queries of the graph. In particular, as graphs expand with a greater quantity of vertices and edges, queries to the graphs may consume additional processing and time resources to search the graph and respond to the queries. These difficulties are often compounded when each of the vertices includes multiple searchable attributes, such as names, ages, birthdays, or other similar attributes, requiring a system to traverse the vertices of the graph to identify vertices (or edges) with a relevant attribute.

OVERVIEW

Provided herein are enhancements to improve graph searches related to multiple attributes of vertices. In one implementation, a method includes receiving a request to identify vertices of a first vertex type in a graph, the vertices associated with one or more attributes. The method further includes identifying one or more index vertices associated with the one or more attributes, wherein the one or more index vertices corresponds to one or more second vertex types. The method also includes identifying the one or more vertices in the graph with edges that couple to the plurality of index vertices.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

DETAILED DESCRIPTION

Examples herein provide operations to identify vertices of interest in a graph using index vertices. In one implementation, a graph management system may maintain a graph that includes a plurality of vertices and a plurality of edges that are used to define relationships between the plurality of vertices. Here, a graph may include vertices of various types, wherein a first vertex type may correspond to data instance that comprises multiple attributes (referred to herein as data instance vertices). These attributes may comprise a unique identifier for the vertex or data instance, numerical values, descriptive information for the data instance, or some other attribute for the data instance. As an example, a graph of a social network may include data instance vertices that correspond to users of the social network. Each of the data instance vertices may include a unique identifier associated with the user, which may be used as a primary index, the age of the user, the location of the user, or some other attribute of the user. Here, in addition to the data instance vertices, additional vertices may be added to the graph that can be used to provide indexing based on different attributes of the data instances. Referring again to the social network example, data instance vertices representing users may be indexed using a first attribute that corresponds to a unique identifier for the individual user. However, additional vertices may be added to the graph, referred to as index vertices, that can be used to index the users based on attributes other than the unique identifiers. These attributes may include age, location, occupation, or some other attribute of the user. Thus, rather than using a single index to search the data instances of the graph, index vertices may be added to the graph permitting the graph to be indexed using multiple attributes of the data instances.

Once a graph is generated with the data instance vertices and the index vertices, queries may be generated to obtain information from the graph. For example, a query may be generated for the graph that requests a list of users in a social network that are in a first geographic location and are a defined age. In response to the query, the graph management system may identify index vertices that correspond to the location and the age requirements and determine data instance vertices that are coupled to both the location index and the age vertex. In some implementations, the graph management system may generate metadata or flags associated with each of the data instance vertices. For example, the graph management system may add a flag to a data instance vertex when it is coupled to an index vertex of interest. When a data instance vertex receives the required quantity of flags, then the data instance vertex may be determined to be relevant to the query. Returning to the example of the query to a social network with an age requirement and a location requirement, the graph management system may determine which data instance vertices are allocated two flags or metadata values and identify the data instance vertices as vertices of interest to respond to the query. Advantageously, adding flags or metadata to the corresponding data instance vertices while implementing the search of the graph may permit the graph management system to efficiently identify data instance vertices of interest that correspond to a query.

Figure 1:
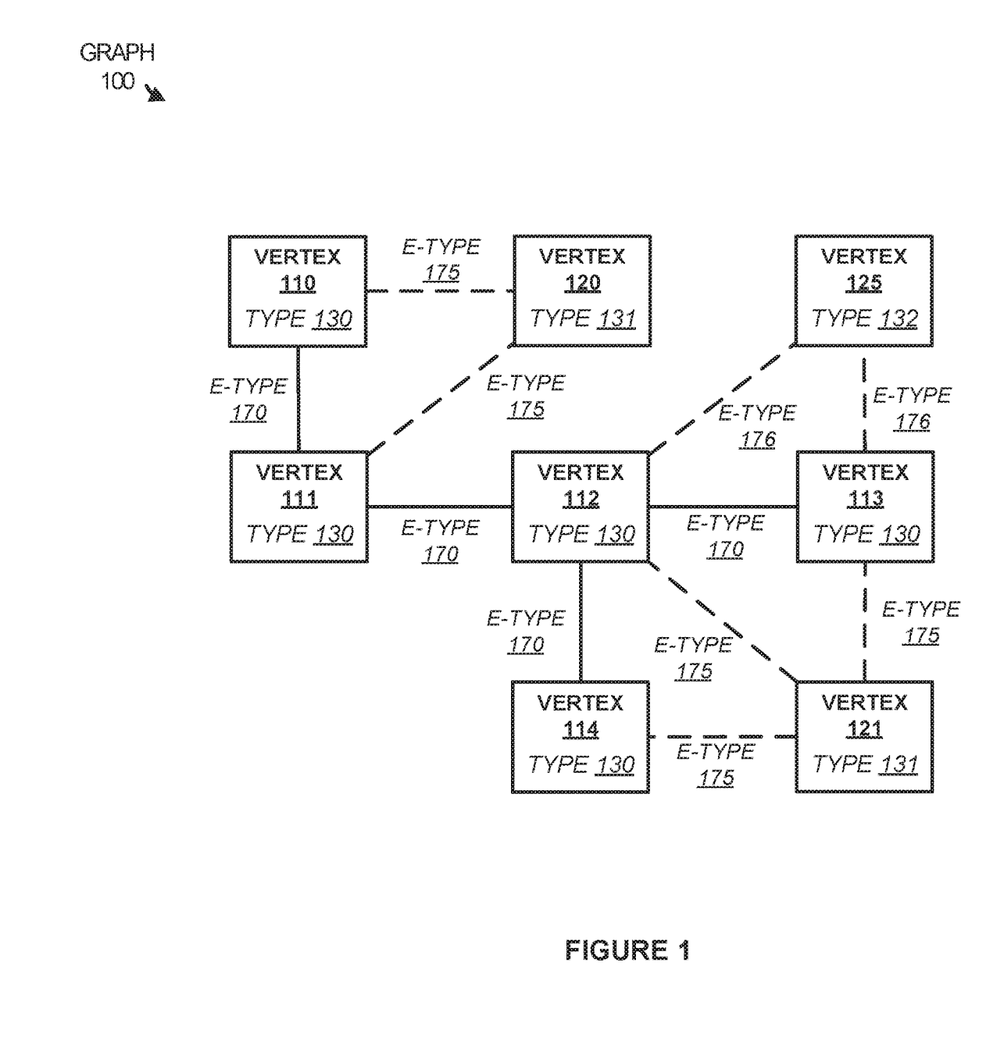
FIG. 1 illustrates a graph with different vertex types according to an implementation.

FIG. 1 illustrates a graph 100 with different vertex types according to an implementation. Graph 100 includes vertices 110-114 of vertex type 130, wherein vertex type 130 are representative of data instance vertices. Graph 100 further includes vertices 120-121 and vertex 125 that correspond to vertex types 131-132, wherein vertex types 131-132 each correspond to an index vertex type. Vertices 110-114, 120-121, and 125 are coupled via edges of edge types 170 and 175-176. Edge type 170 is representative of an edge type that is used to couple the data instance vertices, while edge types 175-176 are used to couple or connect the data instance vertices to corresponding index vertices of vertex types 131-132.

In operation, a graph management system may generate graph 100 to manage data and provide search operations on the data. Graph 100 includes vertices 110-114 that are representative of data instance vertices that can be used represent various entities or data objects. These data objects may include users of a social network, employees of an organization, buildings or other physical elements, or some other data object. Each data instance vertex in vertices 110-114 may comprise a plurality of attributes corresponding to the object. For example, a user in a social network may include a unique identifier associated with the user, a location of the user, an age of the user, employment information for the user, or some other information for the user. To index vertices 110-114, the unique identifier may be used to distinguish each of the individual vertices, wherein the unique identifier may comprise a numerical value, a name, a combination of characters, or some other unique identifier for the data instance. Here, in addition to indexing vertices 110-114 using a unique identifier associated with each of the vertices, vertices 120-121 and 125 are added to enhance searches for information related to vertices 110-114.

Vertices 120-121 and 125 may be added to the graph in response to a request of an administrator associated with the graph, may be added based on query trends to graph 100, or may be added via any other mechanism. Vertices 120-121 and 125 may represent attributes that can be shared by two or more data instance vertices 110-114. For example, in a social network, vertex types 130-131 may represent ages of the users in the social network (range or exact value), locations of the users in a social network, or some other attribute that can be shared by two or more users in the social network. In deploying vertices 120-121 and 125, the graph management system may determine attributes in the data instances related to the particular attribute type and generate vertices that correspond to the identified attributes. Thus, if the users of a social network resided in three locations, then three index vertices may be generated that correspond to the identified attributes. Once generated, edges may be used to connect the generated index vertices with data instance vertices that include the corresponding attribute.

Advantageously, by adding vertex types 131-132 to graph 100, the graph management system may use vertex types 131-132 to efficiently identify relevant data instance vertices for a query and use the data instance vertices to respond to the query. In some implementations, the queries to graph 100 may require the identification of data instances that include multiple attributes. Rather than traversing the data instance vertices 110-114, the graph management system may identify index vertices of vertex types 131-132 that correspond to the attributes in the query and use the index vertices to identify the relevant data instance vertices in graph 100. Once identified, the graph management system may respond to the query using information obtained from the identified data instance vertices.

Figure 2:
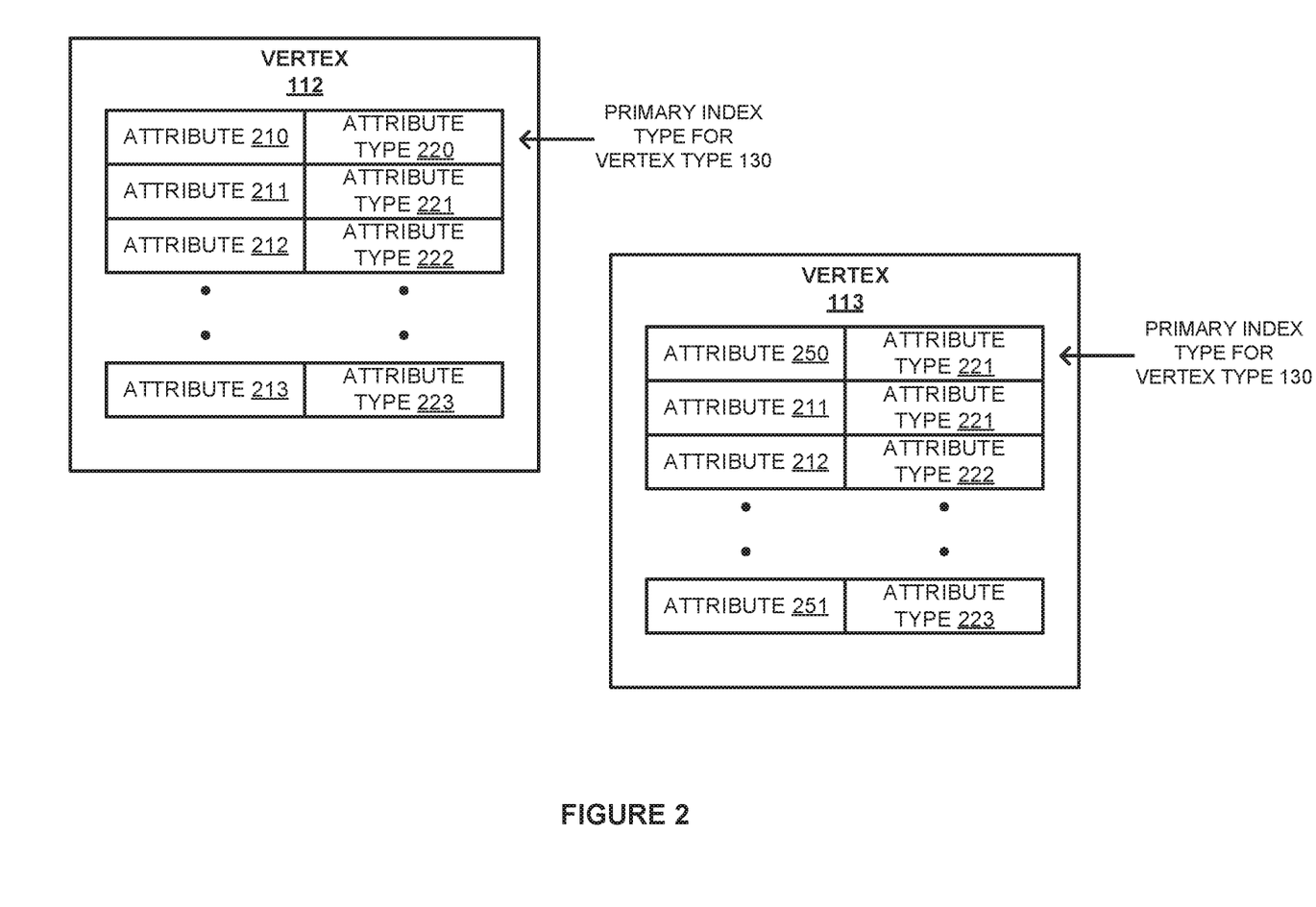
FIG. 2 illustrates vertices of a first vertex type according to an implementation.

FIG. 2 illustrates vertices 112-113 of a first vertex type from graph 100 of FIG. 1 according to an implementation. Vertices 112-113 are representative of data instance vertices from graph 100, wherein the data instance vertices may represent members of a social media network, employees of an organization, buildings, devices, or some other similar object or data element. Each vertex includes attributes that correspond to attribute types 220-223. In particular vertex 112, includes attributes 210-213, and vertex 113 includes attributes 250-251 and 211-212.

Here, vertices 112-113 are each indexed using attribute type 220, wherein attribute type 220 may correspond to a unique identifier for the vertex that can be used to distinguish the vertex from other vertices of the same vertex type. For example, if graph 100 represented employees of the organization, attribute type 220 may correspond to an employee number or some other value that is used to differentiate each of the employees of the organization. In addition to the unique identifier, each of the data instance vertices may include additional attributes that can provide additional information about the data instance. The additional attributes may be shared among one or more other data instances of graph 100, wherein the attributes may correspond to ages, locations, occupations, or some other attribute that can be shared between multiple data instance vertices.

Although demonstrated in the example of FIG. 2 as including four attributes as part of the data instance, it should be understood that any number of attributes may be associated with a data instance. Further, while all the vertices may comprise the same attributes, at least a portion of the vertices may only contain a subset of the attributes. As a result, the index vertices may only be connected to data instance vertices that include a corresponding attribute.

Figure 3:
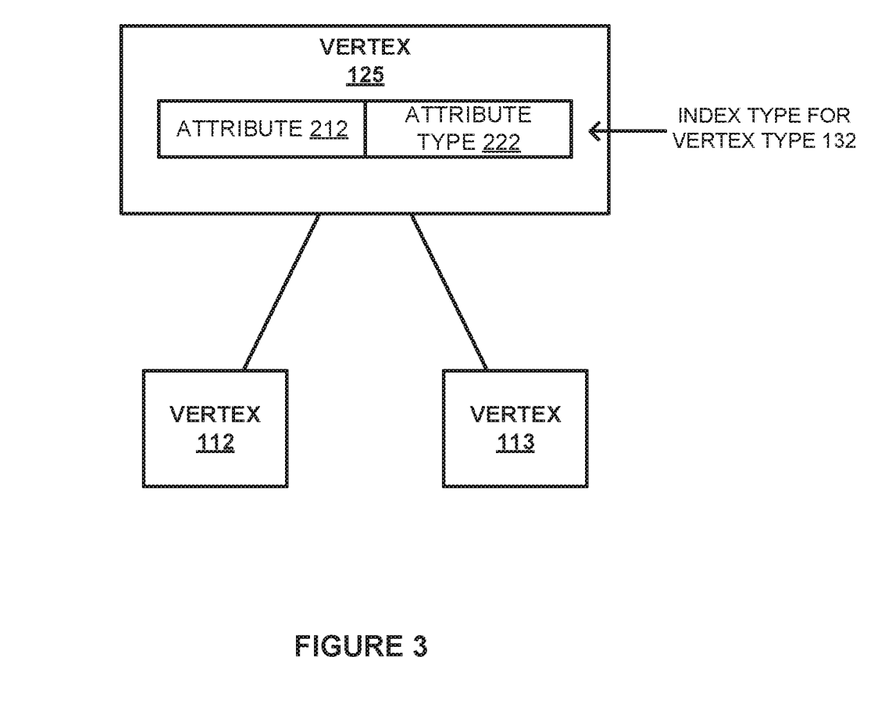
FIG. 3 illustrates an index vertex to provide additional indexing for a graph according to an implementation.

FIG. 3 illustrates an index vertex 125 from graph 100 of FIG. 1 to provide additional indexing for a graph according to an implementation. Vertex 125 is representative of a vertex of vertex type 132, wherein vertex type 132 may be used to provide additional indexing for vertices 110-114. In particular, while vertices of vertex type 130 are indexed using a first attribute, vertex type 132 may be used to further index vertices of vertex type 130 using a second attribute.

Here, vertex 125 is used to index vertices using attribute 212 of attribute type 222. Because vertices 112-113 include attribute 212 of attribute type 222, a graph management system may generate an edge that connects vertices 112-113 to vertex 125, such that vertex 125 can be used to assist in queries related to attribute 212 and attribute type 222. For example, if attribute type 222 corresponds to locations and attribute 212 corresponds to a particular location, then the graph management system may identify any of the data instance vertices that include the attribute for the particular location. Once identified, edges may be generated that can couple the index vertex to the data instance vertices.

Once the graph is generated with the data instance vertices as well as the index vertices, queries may be generated to the graph that request information related to the graph. Referring to a social media example, a query may be generated to identify all users associated with a particular location and a particular occupation. In response to the request, the graph management system may identify index vertices in the graph that correspond to the attributes defined in the query. After identifying the index vertices, the graph management system may identify data instance vertices that connect to all of the index vertices and generate a response to the query using the identified data instance vertices. The response may include providing, for display, one or more attributes from the identified data instance vertices, a quantity of data instance vertices that were identified, or some other information to respond to the query.

Figure 4:
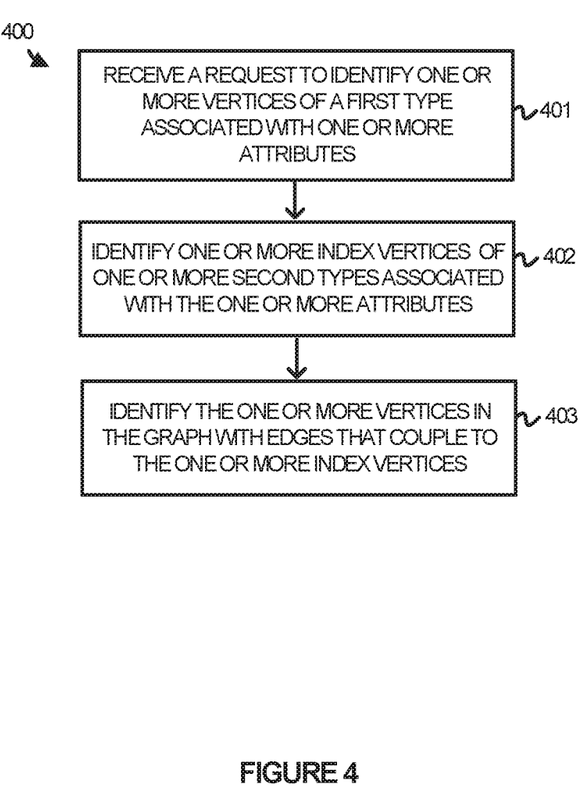
FIG. 4 illustrates an operation of a graph management system according to an implementation.

FIG. 4 illustrates an operation 400 of a graph management system according to an implementation. The processes of operation 400 are referenced parenthetically in the paragraphs that follow with reference to elements of graph 100 of FIG. 1.

As depicted, a graph management system may receive (401) a request to identify one or more vertices of a first type associated with one or more attributes. As described herein, a graph, such as graph 100, may include data instance vertices that each comprise attributes that provide information about the data instance. To index or identify each of the individual data instance vertices, the data instance vertices may be indexed according to first attribute type, wherein the attribute type may comprise a unique identifier for the data instance. The unique identifier may comprise a number, a name, a combination of characters, or some other unique identifier capable of distinguishing the vertices of the first type.

Once the request is received, the graph management system further identifies (402) one or more index vertices associated with the one or more attributes, wherein the one or more index vertices corresponds to one or more second vertex types. In some implementations, in addition to the data instance vertices of a graph, additional vertex types may be added to the graph to assist in search operations associated with the graph. As an example of a social network graph, users of the social network may be represented in the graph as data instance vertices. In addition to the data instance vertices, additional vertex types may be included, wherein the vertex types may each represent a location vertex type associated with location attributes of the end users, an age vertex type associated with age attributes of the end users, or some other vertex type. For each of the vertex types, one or more index vertices may be added to the graph that correspond to attributes identified in the data instance vertices that correspond to the vertex type. Thus, referring to the location vertex type, one or more vertices may be added to the graph that correspond to different locations identified in the data instance vertices. Once the index vertices are added to a graph, queries to the graph may use the index vertices to respond to the queries.

In some examples, in response to a query, the graph management system may determine index vertices that correspond to the requirements of the query. Referring again to the social network graph, when a query is generated to identify users associated with a first location and a first occupation, the graph management system will identify index vertices that correspond to the attributes (location and occupation) defined in the query. In some examples, to identify the index vertices, the graph management system may identify an attribute type and corresponding vertex type associated with the attribute in the query, then determine which of the index vertices corresponds to the attribute of the query.

After identifying the one or more index vertices associated with the one or more attributes from the request, the graph management system identifies (403) the one or more vertices in the graph with edges that couple to the one or more index vertices. In some implementations, to determine which of the first type vertices or data instance vertices are coupled to the relevant index vertices, the graph management system may use flags or metadata values to determine the quantity of index vertices that are coupled to the various data instance vertices in a graph. For example, if three index vertices were identified for attributes in a request, the graph management system may, for each of the index vertices, generate a flag or metadata value for the data instance vertices that are coupled to the index vertex. After generating the metadata values for the data instance vertices, a subset of the data instance vertices is identified based on the metadata, wherein the metadata may indicate that all three of the relevant index vertices are coupled to the subset. The subset of data instance vertices may be then be used to respond to the request.

In one implementation, the tagging of the data instance vertices that are coupled to the relevant index vertices may be accomplished in parallel. For example, a first index vertex may tag the data instance vertices that are coupled to the first index vertex, while a second index vertex may tag the data instance vertices that are coupled to the second index vertex. In other implementations, the tagging of the data index vertices may be accomplished in serial, wherein data instance vertices that are coupled to a first index vertex are determined prior to data instance vertices that are coupled to a second index vertex. As an example, the graph management system may for a first index vertex, identify and tag first data instance vertices that are coupled to the first index vertex. Once completed, the graph management system may, for a second index vertex, identify and tag any of the first data instance vertices identified for the first index vertex that are also coupled to the second index vertex. The first data instance vertices that are also tagged as being coupled to the second index vertex may then be classified as second data instance vertices. The operation may be repeated as many times as is required to identify the data instance vertices to respond to the request.

In some implementations, the request to identify the data instance vertices may correspond to a user or automated system query to the graph. In particular, the query may attempt to identify information from the data instance vertices based on attributes of the data instance vertices. An example query may include, identifying the average age of users in a social network that have a first occupation and are located in a specific location. In response to the query, the graph management system may determine the searchable attributes for the graph, which would include the occupation and location, identify index vertices (if available) associated with the attributes, and search the graph using the index vertices to identify the relevant data instance vertices. Once the data instance vertices are identified, the graph management system may perform additional operations to respond to the query, wherein the operations may include identifying attributes in the data instance vertices, averaging attributes in the data instance vertices, determining a most frequent value in the attributes, generating a display based on the attributes of the data instance vertices, or some other operation to respond to the query.

Figure 5A:
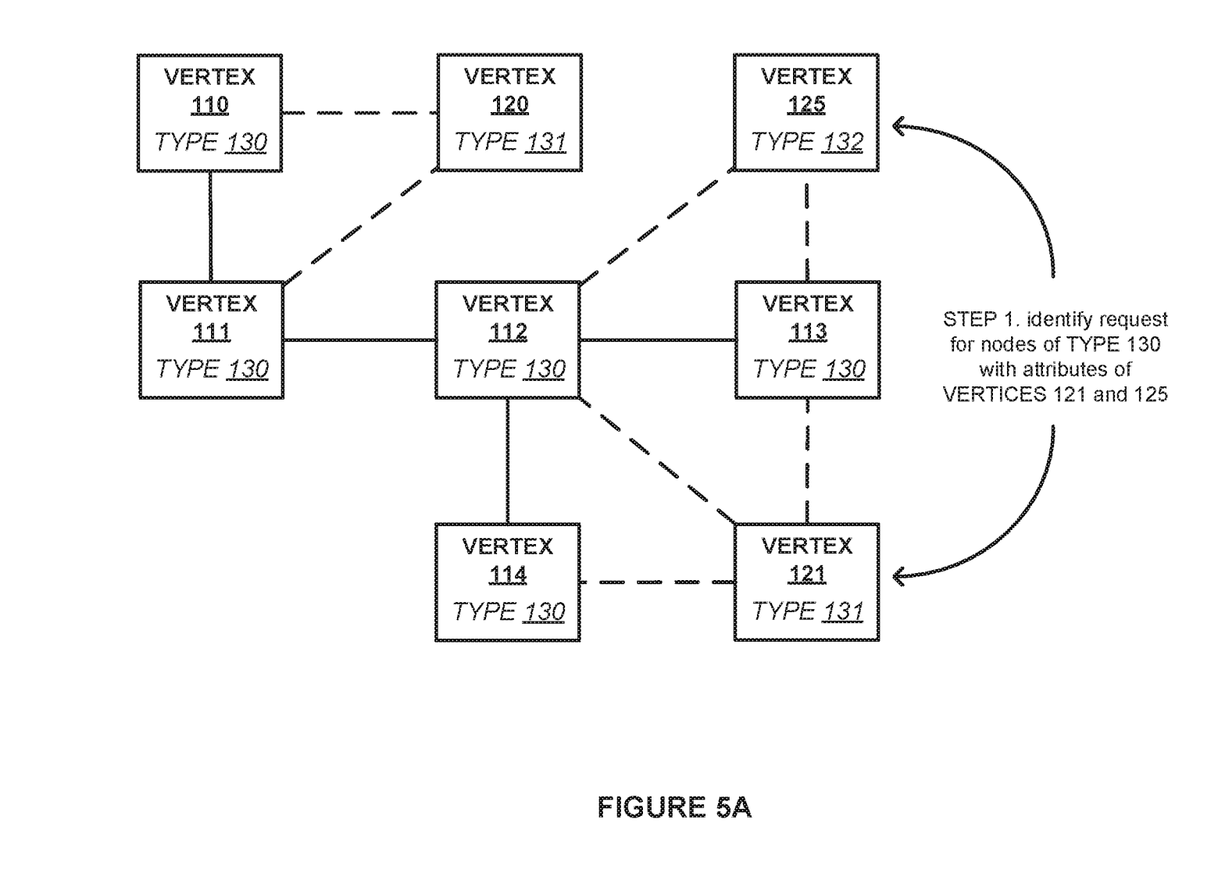
FIGS. 5A and 5B illustrate an operational scenario of identifying vertices of interest in a graph using index vertices according to an implementation.
Figure 5B:
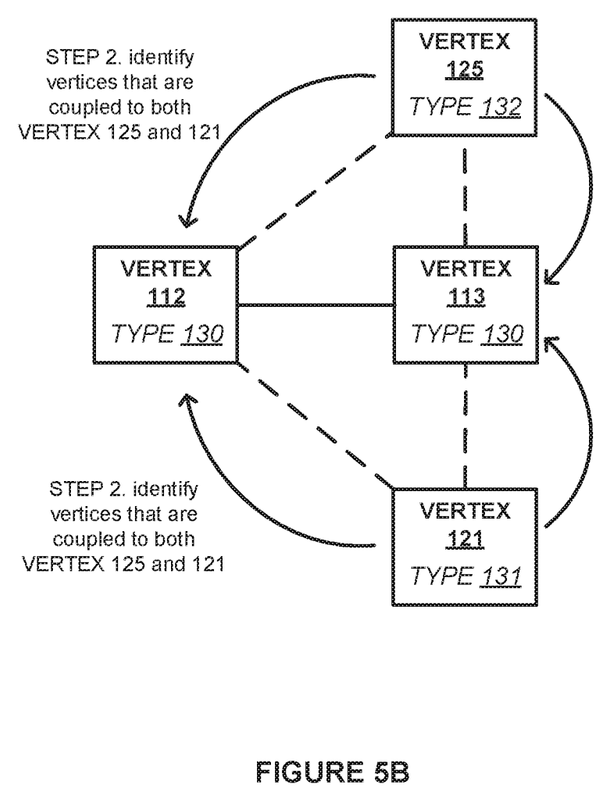

FIGS. 5A and 5B illustrate an operational scenario of identifying vertices of interest in a graph using index vertices according to an implementation. FIG. 5A includes vertices 110-114, 120-121, and 125 from graph 100 of FIG. 1. FIG. 5B includes vertices 112-113, 121, and 125. The operational scenario of FIGS. 5A and 5B is representative of an operation that may be accomplished using a graph management system that can operate using one or more computing systems, such as server computing systems, desktop computing systems, or some other computing system.

Referring to FIG. 5A, a graph management system may obtain a request to identify one or more vertices of a first type associated with one or more attributes. Here, the graph management system identifies, at step 1, a request to identify one or more vertices of vertex type 130 that are associated with two attributes. The two attributes are associated with vertices 121 and 125, wherein vertex 121 corresponds to a vertex type 131 and vertex 125 corresponds to a vertex type 132. Vertex types 131-132 are representative of index vertex types that can be used to provide supplemental indexing for data instance vertices in a graph. In particular, data instance vertices, represented as vertices 110-114, may include a variety of attributes and may be indexed using a first one of the attributes. This indexing may include a unique identifier, such as a unique set of characters, numbers, or some other unique identifier that can be used to distinguish vertices 110-114. Here, vertices 120-121 and 125 correspond to attributes other than the indexing attribute used in vertices 110-114. For example, an organization the data instance vertices 110-114 may correspond to employees of the organization and the index for vertices 110-114 may correspond to a unique identifier for the employees. However, index types 131-132 may correspond to other attributes for the employees, including the occupation of the employees, the home office of the employees, or some other information of the employees. Thus, rather than only traversing the data instance vertices to identify required information, the graph management system may use the index vertices of vertex types 131-132 to more efficiently identify the data instance vertices of interest.

Turning to FIG. 5B, once the corresponding index vertices of the request are identified, the graph management system may identify, at step 2, data instance vertices that are coupled to both of the index vertices. In some implementations, the graph management system may use tags that can maintain information about the quantity of index vertices that connect to the data instance vertices. As an example, when the graph management system determines the data instance vertices that are coupled to vertex 125, the graph management system may tag each of vertices 112-113. Similarly, when the graph management system determines the data instance vertices that are coupled to vertex 121, the graph management system may tag vertices 112-114. Here, because the graph management system is attempting to identify the data instance vertices that are coupled to both vertex 121 and vertex 125, the graph management system will identify vertices 112-113 as relevant because they were tagged twice.

In some implementations, the tagging or identification of the data instance vertices that are related to the index vertices may occur in parallel. In particular, the graph management system may tag the data instance vertices that are related to vertex 125 and may tag the data instance vertices that are related to vertex 121 at the same time. Once a data instance vertex has been tagged twice, the data instance vertex may be identified to respond to the request. In other implementations, the identification of the relevant instance vertices may occur at least partially in serial. For example, the graph management system may tag data instance vertices that are coupled to vertex 125 and subsequently tag data instance vertices that are coupled to vertex 121 that have already been tagged as being coupled to vertex 125. Thus, since vertex 114 was not tagged by the graph management system with respect to vertex 125, the graph management system may ignore the connection with respect to vertex 121. In some examples, the order at which the different index vertices are processed may be based on the quantity of data instance vertices that are coupled to the index vertices. As a result, the index vertex coupled with the least amount of data instance vertices may be processed first to tag the corresponding data instance vertices. Once tagged, the graph management system may move to the next index vertex coupled with the least amount of data instance vertices and determine data instance vertices that were tagged in association with the previous index vertex and tag these data instance vertices as being coupled to both index vertices. The process may then be repeated for as many index vertices that are identified to support the request to the graph. Although demonstrated in the previous example as identifying data instance vertices related to two index vertices, it should be understood that any quantity of index vertices may be identified to respond to a request.

In some implementations, the request to identify relevant data instance vertices may comprise a portion of the operations to respond to a query to the graph. As an example, a query to a graph representing a social network, may attempt to identify the average age of a user that is associated with a particular location and occupation. Index vertices may be used to identify the corresponding data instance vertices that correspond to the users, but the graph management system may further extract relevant information from the corresponding data instance vertices and process the data to provide the response to the query. The processing may include averaging the age of the identified users, generating a display to respond to the query, or some other process on attributes identified in the relevant data instance vertices.

Although demonstrated in the previous example as exclusively using index vertices to identify the relevant data instance vertices, it should be understood that index vertices may not exist for every attribute in the data instance vertices. In some implementations, when a query is generated, the graph management system may identify attributes in the query that correspond to attribute types with index vertices in the graph. The graph management system may then use the index vertices to identify a first set of data instance vertices. Once the first set of data instance vertices are identified, the graph management system may search the data instance vertices to identify any other attributes relevant to the query that do not correspond to index vertices. From this search, a relevant set of data instance vertices may be determined that includes the required attributes from the query. Thus, in some examples, a combination of identifying data instance vertices using index vertices and searching attributes in the data instance vertices may be employed.

Figure 6:
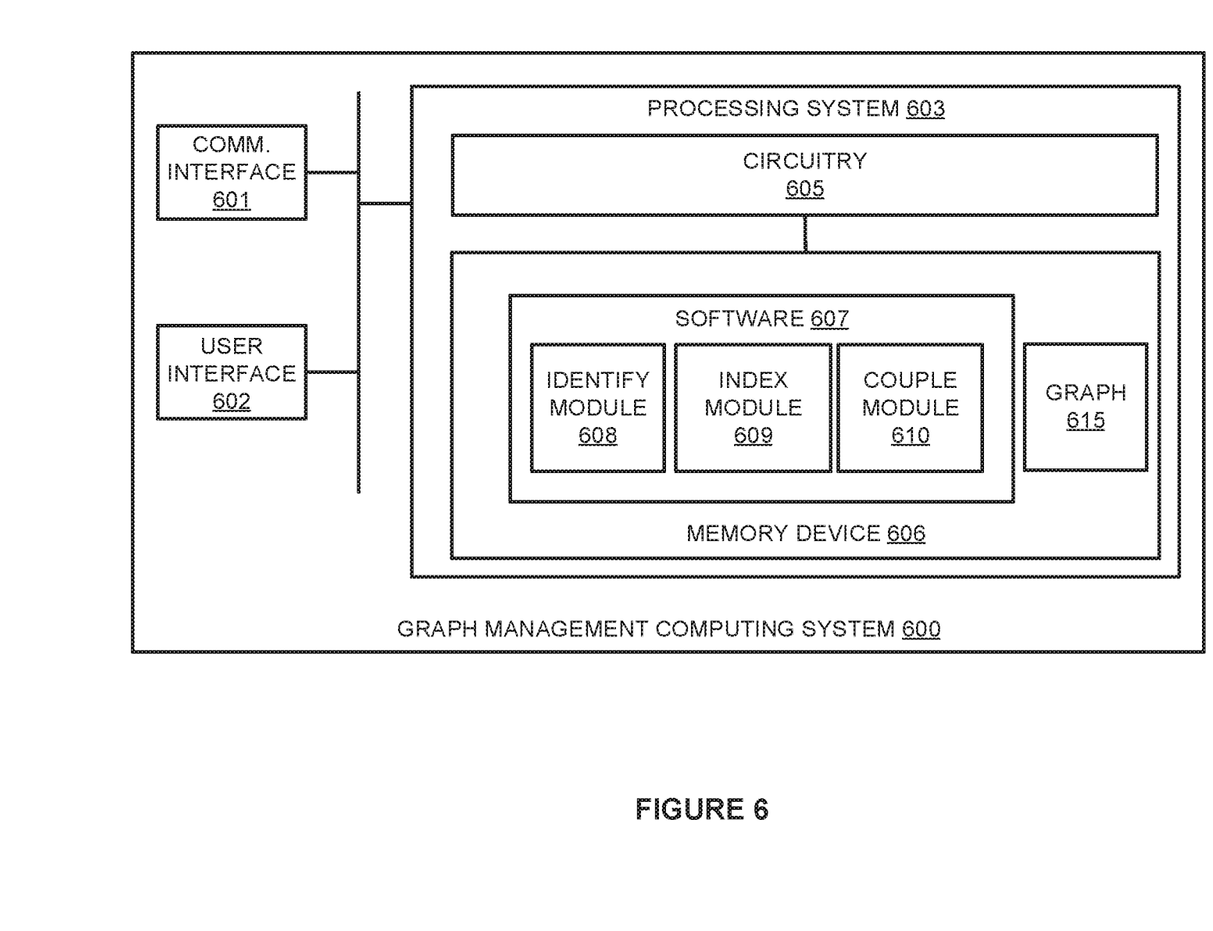
FIG. 6 illustrates a graph management computing system according to an implementation.

FIG. 6 illustrates a graph management computing system 600 according to an implementation. Computing system 600 is representative of any computing system or systems with which the various operational architectures, processes, scenarios, and sequences disclosed herein for a graph management system may be implemented. Computing system 600 comprises communication interface 601, user interface 602, and processing system 603. Processing system 603 is linked to communication interface 601 and user interface 602. Processing system 603 includes processing circuitry 605 and memory device 606 that stores operating software 607. Computing system 600 may include other well-known components such as a battery and enclosure that are not shown for clarity.

Communication interface 601 comprises components that communicate over communication links, such as network cards, ports, radio frequency (RF), processing circuitry and software, or some other communication devices. Communication interface 601 may be configured to communicate over metallic, wireless, or optical links. Communication interface 601 may be configured to use Time Division Multiplex (TDM), Internet Protocol (IP), Ethernet, optical networking, wireless protocols, communication signaling, or some other communication format—including combinations thereof. In at least one implementation, communication interface 601 may be configured to communicate with one or more client computing systems, wherein the communications may be used to define queries to graph 615 or provide a response to the queries to the client system User interface 602 comprises components that interact with a user to receive user inputs and to present media and/or information. User interface 602 may include a speaker, microphone, buttons, lights, display screen, touch screen, touch pad, scroll wheel, communication port, or some other user input/output apparatus—including combinations thereof. User interface 602 may be omitted in some examples.

Processing circuitry 605 comprises microprocessor and other circuitry that retrieves and executes operating software 607 from memory device 606. Memory device 606 may include volatile and nonvolatile, removable and non-removable media implemented in any method or technology for storage of information, such as computer readable instructions, data structures, program modules, or other data. Memory device 606 may be implemented as a single storage device but may also be implemented across multiple storage devices or sub-systems. Memory device 606 may comprise additional elements, such as a controller to read operating software 607 and data for graph 615. Examples of storage media include random access memory, read only memory, magnetic disks, optical disks, and flash memory, as well as any combination or variation thereof, or any other type of storage media. In some implementations, the storage media may be a non-transitory storage media. In some instances, at least a portion of the storage media may be transitory. In no case is the storage media a propagated signal.

Processing circuitry 605 is typically mounted on a circuit board that may also hold memory device 606 and portions of communication interface 601 and user interface 602. Operating software 607 comprises computer programs, firmware, or some other form of machine-readable program instructions. Operating software 607 includes identify module 608, index module 609, and couple module 610, although any number of software modules may provide a similar operation. Operating software 607 may further include an operating system, utilities, drivers, network interfaces, applications, or some other type of software. When executed by processing circuitry 605, operating software 607 directs processing system 603 to operate computing system 600 as described herein.

In one implementation, identify module 608 directs processing system 603 to receive a request to identify one or more vertices of a first vertex type in graph 615, wherein the request may indicate attributes of interest associated with the one or more vertices. In some implementations, the first vertex type may comprise a data instance vertex type, wherein the data instance vertex type may comprise attributes and may be indexed by one of the attributes. In response to the request, index module 609 may direct processing system 603 identify a plurality of index vertices associated with the attributes of interest, and wherein the index vertices correspond to second vertex types. Each of the second vertex types may correspond to an attribute type that is not used in indexing the data instance vertices. For example, in a social network, while the vertices representing users of the social network may be indexed using unique identifiers associated with the users, additional index vertices may be added that correspond to other attributes of the user. These index vertices may permit traversal of the index vertices to identify users associated with specific attributes.

Once the index vertices are identified that correspond to the request, couple module 610 may direct processing system 603 to identify the one or more vertices of the first type that are coupled to the index vertices that are of a different type. In some implementations, couple module 610 may identify the coupled vertices in parallel for each of the index vertices. In other implementations, couple module 610 may identify the coupled vertices in serial, wherein the coupled vertices to a first index vertex may then be used to determine whether the Although not depicted in computing system 600, it should be understood that one or more software modules may be used by computing system 600 to generate the graph. In generating the graph, the computing system 600 may identify, via user input, via information from a database, or from some other input source, information to generate the data instance vertices for graph 615. As the data instance vertices are generated for the graph, computing system 600 may further determine other attribute types of interest that could correspond to index vertices to be added to the graph. The index vertices may be defined by an administrator associated with graph 615, may be determined based on the frequency of queries to graph 615 regarding a particular attribute, or may be determined in any other manner. As an example, computing system 600 may monitor the frequency of queries associated with each attribute type and determine when the frequency meets one or more criteria. When the frequency of queries meets the one or more criteria (e.g., a minimum quantity of queries over time), computing system 600 may define a new index vertex type associated with the attribute and generate index vertices based on the attributes defined in the graph. These index vertices may each correspond to single values (e.g., age, location, etc.) or may correspond to a range of values or multiple values. The values for the index vertices may be defined by the administrator or may be based on trends associated with the queries to the graph. Once the attribute types are identified and the index vertices are added to the graph data instance vertices may be coupled to the index vertices that share common attributes. Thus, an index vertex that is associated with a range of ages may be coupled to all data instance vertices with attributes that fall within the range of ages.

The included descriptions and figures depict specific implementations to teach those skilled in the art how to make and use the best option. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

What is claimed is:

1. A method of searching a graph, wherein the graph comprises a plurality of vertices of a first vertex type and a plurality of index vertices of one or more other vertex types, the method comprising:

receiving a request to identify one or more vertices of the first vertex type in the graph with one or more attributes;

in response to the request, identifying one or more index vertices of the plurality of index vertices each with at least one attribute of the one or more attributes, wherein the one or more index vertices comprise one or more second vertex types of the one or more other vertex types, wherein the one or more index vertices are each indexed using at least one attribute of the one or more attributes, and wherein the one or more vertices are each indexed using a different attribute than the one or more attributes; and identifying the one or more vertices in the graph based on each vertex of the one or more vertices having one or more edges that couple the vertex to each of the one or more index vertices.

2. The method of claim 1, wherein the plurality of vertices comprises data instance vertices of the first vertex type.

3. The method of claim 2, wherein identifying the one or more vertices in the graph based on each of the one or more vertices having one or more edges that couple the edge to each of the one or more index vertices comprises:

for each index vertex in the one or more index vertices, generating a flag for any of the data instance vertices coupled to the index vertex;

identifying a set of one or more of the data instance vertices that are coupled to each of the one or more index vertices based on the flags; and identifying the set of the one or more data instance vertices as the one or more vertices.

4. The method of claim 3, wherein the flags indicate a quantity of the one or more index vertices coupled to a data instance vertex in the graph.

5. The method of claim 2, wherein identifying the one or more vertices in the graph based on each of the one or more vertices having one or more edges that couple the edge to each of the one or more index vertices comprises:

(a) for a first index vertex of the one or more index vertices, identifying a first subset of the data instance vertices coupled to the first index vertex;

(b) after identifying the first subset and for a second index vertex of the one or more index vertices, identifying a second subset of the data instance vertices from the first subset of the data instance vertices that is coupled to the first index vertex and the second index vertex;

(c) determine whether a subset of data instance vertices has been identified for each vertex in the one or more index vertices;

(d) in response to determining that a subset of data instance vertices has not yet been identified for each vertex in the one or more index vertices, repeating steps (b) and (c) with the second index vertex as the first index vertex, the second subset as the first subset, and a new index vertex of the one or more index vertices as the second index vertex; and (e) in response to determining that a subset of data instance vertices has been identified for each vertex in the one or more index vertices, identifying the second subset of the data instance vertices as the one or more vertices.

6. The method of claim 2, wherein the data instance vertices each comprise attribute types, wherein the data instance vertices are indexed using a first attribute type of the one or more attribute types, and wherein the index vertices are indexed using different attribute types from the first attribute type.

7. The method of claim 1 further comprising causing, for display, one or more attributes associated with the one or more vertices to respond to the request.

8. The method of claim 1 further comprising:

identifying the request from an obtained query to the graph; and processing one or more attributes in the one or more vertices to generate a response to the query.

9. A computing apparatus comprising:

one or more non-transitory computer readable storage media;

a processing system operatively coupled to the one or more non-transitory computer readable storage media; and program instructions stored on the one or more non-transitory computer readable storage media to search a graph comprising a plurality of vertices of a first vertex type and a plurality of index vertices of one or more other vertex types that, when executed by the processing system, direct the processing system to:

receive a request to identify one or more vertices of the first vertex type in the graph, wherein the request indicates one or more attributes associated with the one or more vertices;

in response to the request, identify one or more index vertices of the plurality of index vertices each with at least one attribute of the one or more attributes, wherein the one or more index vertices comprise one or more second vertex types of the one or more other vertex types, wherein the one or more index vertices are each indexed using at least one attribute of the one or more attributes, and wherein the one or more vertices are each indexed using a different attribute than the one or more attributes; and identify the one or more vertices in the graph based on each vertex of the one or more vertices having one or more edges that couple the vertex to each of the one or more index vertices.

10. The computing apparatus of claim 9, wherein the plurality of vertices comprises data instance vertices of the first vertex type.

11. The computing apparatus of claim 10, wherein identifying the one or more vertices in the graph based on each of the one or more vertices having one or more edges that couple the edge to each of the one or more index vertices comprises:

for each index vertex in the one or more index vertices, generating a flag for any of the data instance vertices coupled to the index vertex;

identifying a set of one or more of the data instance vertices that are coupled to each of the one or more index vertices based on the flags; and identifying the set of the one or more data instance vertices as the one or more vertices.

12. The computing apparatus of claim 11, wherein the flags indicate a quantity of the one or more index vertices coupled to a data instance vertex in the graph.

13. The computing apparatus of claim 10, wherein the one or more vertices in the graph based on each of the one or more vertices having one or more edges that couple the edge to each of the one or more index vertices comprises:

(a) for a first index vertex of the one or more index vertices, identifying a first subset of the data instance vertices coupled to the first index vertex;

(b) after identifying the first subset and for a second index vertex of the one or more index vertices, identifying a second subset of the data instance vertices from the first subset of the data instance vertices that is coupled to the first vertex and the second vertex;

(c) determine whether a subset of data instance vertices has been identified for each vertex in the one or more index vertices;

(d) in response to determining that a subset of data instance vertices has not yet been identified for each vertex in the one or more index vertices, repeating steps (b) and (c) with the second index vertex as the first index vertex, the second subset as the first subset, and a new index vertex of the one or more index vertices as the second index vertex; and (e) in response to determining that a subset of data instance vertices has been identified for each vertex in the one or more index vertices, identifying the second subset of the data instance vertices as the one or more vertices.

14. The computing apparatus of claim 9, wherein the program instructions further direct the processing system to cause, for display, one or more attributes associated with the one or more vertices to respond to the request.

15. The computing apparatus of claim 9, wherein the program instructions further direct the processing system to:
identify the request from an obtained query to the graph;
process one or more attributes in the one or more vertices to generate a response to the query.

16. The computing apparatus of claim 15, wherein the program instructions further direct the processing system to generate a display of the response to the query.

17. An apparatus comprising:
one or more non-transitory computer readable storage media; and
program instructions stored on the one or more non-transitory computer readable storage media to search a graph comprising a plurality of vertices of a first vertex type and a plurality of index vertices of one or more other vertex types that, when executed by a processing system, direct a processing to:
receive a request to identify one or more vertices of the first vertex type in the graph, wherein the request indicates attributes associated with the one or more vertices;
in response to the request, identify index vertices of the plurality of index vertices each with at least one attribute of the attributes, wherein the index vertices are each indexed using at least one attribute of the attributes, and wherein the one or more vertices are each indexed using a different attribute than the attributes; and
identify the one or more vertices in the graph based on each vertex of the one or more vertices having edges that couple the vertex to each of the index vertices.

* * * * *